June 29, 1965 E. B. FERNBERG ETAL 3,191,243
FASTENER
Filed Nov. 28, 1960 3 Sheets-Sheet 1
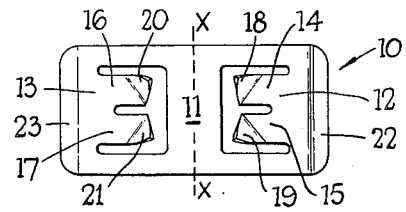
FIG.1
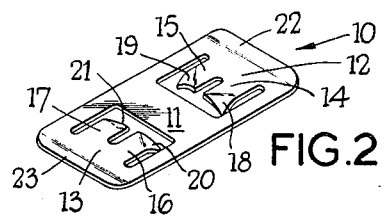
FIG.2
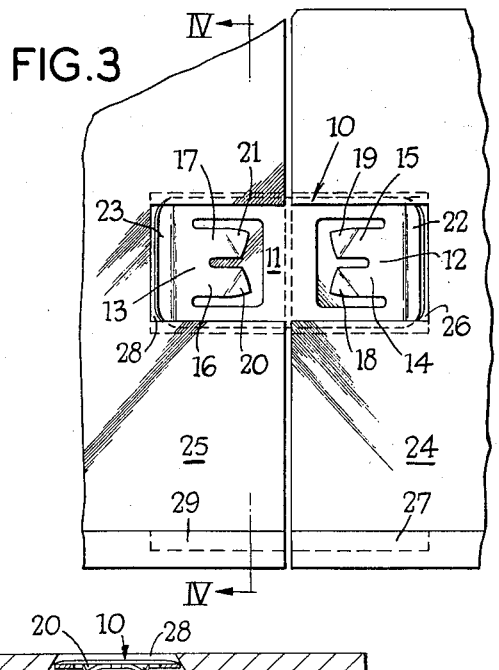
FIG.3
FIG.4
Inventors
Eric B. Fernberg
Clifford A. Deckerson
by Malcolm W. Fraser
attorney June 29, 1965 E. B. FERNBERG ETAL 3,191,243
FASTENER
Filed Nov. 28, 1960 3 Sheets-Sheet 2
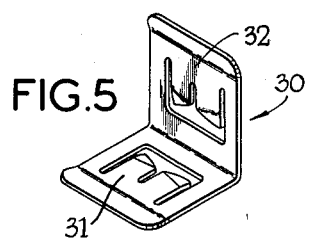
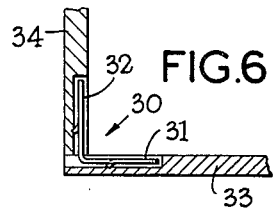
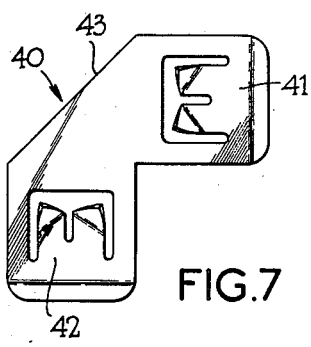
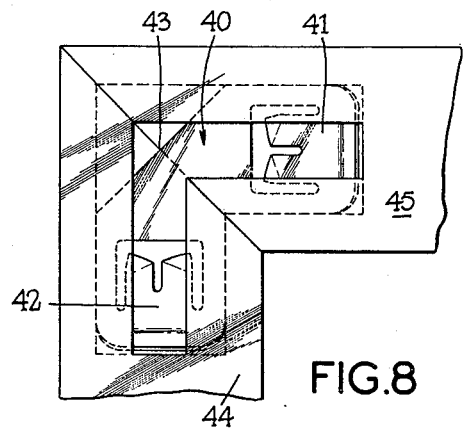
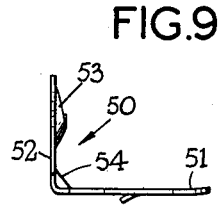
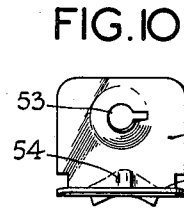
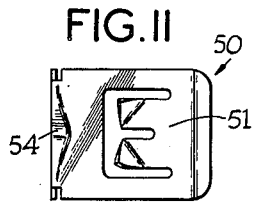
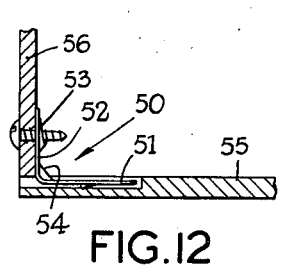
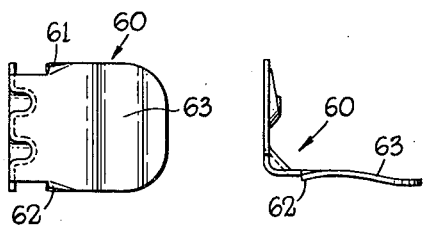
Inventors
Eric B. Fernberg
Clifford A. Deckerson
by Malcolm W. Fraser
attorney June 29, 1965  E. B. FERNBERG ETAL  3,191,243
FASTENER Filed Nov. 28, 1960  3 Sheets-Sheet 3

United States Patent Office 3,191,243
Patented June 29, 1965

3,191,243
FASTENER
Eric Birger Fernberg, Wavendon, near Bletchley, and Clifford Alexander Seckerson, Uxbridge, England, assignors to United-Carr Incorporated, a corporation of Delaware
Filed Nov. 28, 1960, Ser. No. 72,241
Claims priority, application Great Britain, Nov. 27, 1959, 40,471/59; Feb. 29, 1960, 7,069/60; Apr. 4, 1960, 11,864/60
4 Claims. (Cl. 20—92)

The present invention relates to an improved fastener which is particularly but not exclusively suitable for securing two plastic panels together in abutting relationship.

It is known to secure two panels together by forming a slot of rectangular section in each panel and providing a fastener having a portion formed with prongs engaged in each slot, the prongs biting into the edges of the slots to hold the panels together.

Such an assembly has several disadvantages when used to secure together thin panels formed from a relatively soft material. For instance during the process of moulding uneven shrinkage occurs on the panel in the area of the slot marring what should have been the smooth outer surface of the panel. Also, known fasteners used for this purpose have been formed with prongs bearing against the edges of the slot, and when the material of the panel is relatively soft the fastener tears out too easily. Furthermore where the prongs bear against the side edges of the slot there can be only a small tolerance in the width of the slot and the fastener.

It is an object of the present invention to provide a means of securing together two thin slotted panels formed from a relatively soft material, or one such panel to another member in such a way that any uneveness or marking on the outer surface of the panel or panels in the region of the slot is greatly reduced or eliminated.

It is a further object of the invention to provide an assembly as described above which allows for considerable tolerance in the dimensions of the slot or slots and the fastener engaged therein.

It is yet a further object of the invention to provide a fastener for use in the above described assembly which is an easy push fit into the slot in the panel or panels but which is then securely held therein.

Figure 15:
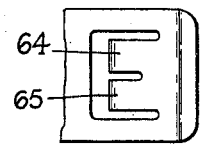
Figure 16:
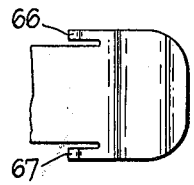

Preferred forms of the invention will now be described with reference to the accompanying diagrammatic drawings in which:

FIGURES 1 and 2 are respectively an under plan and perspective view of a fastener, FIGURES 3 and 4 are respectively a plan and side elevation of an assembly showing the fastener of FIGURES 1 and 2 securing two panels together, FIGURE 5 is a perspective view of a modification of the fastener shown in FIGURES 1 and 2, FIGURE 6 is a side view of an assembly showing the fastener of FIGURE 5 securing two plastic panels together, FIGURE 7 is a plan view of another embodiment of the invention, FIGURE 8 is a plan view of an assembly showing the fastener of FIGURE 7 securing two plastic panels together, FIGURES 9, 10 and 11 are respectively a side elevation, front elevation and underplan of a further embodiment of the invention, FIGURE 12 is a side view of an assembly showing the fastener of FIGURES 9, 10 and 11 securing two plastic panels together, FIGURES 13 and 14 are respectively a plan and side elevation of yet another embodiment of the invention, FIGURES 15 and 16 show a variation of the tongues forming part of the present invention, and FIGURES 17 to 20 illustrate two embodiments of a plastic panel slotted to accept a portion of the fasteners shown in the earlier figures.

In FIGURES 1 to 4 a fastener is indicated generally at 10. The fastener 10 comprises a generally flat strip of spring metal out of which E-shaped areas corresponding with one another but reversed with respect to one another have been cut on either side of the minor axis of symmetry x—x of the strip. Running transversely of the fastener 10 and separating the reversely facing E-shaped cut outs is a bridge 11 which separates a tail portion 12 and a head portion 13 of the fastener 10, which in the present instance happen to be identical.

The E-shaped cut outs form two pairs of generally parallel tongues 14, 15, and 16, 17 which project inwardly and longitudinally of the fastener 10 towards the bridge 11, the tongues 14 and 15 lying in the tail 12 and the tongues 16 and 17 lying in the head 13. The outer corners of the free ends of the tongues 14, 15, 16 and 17 are all bent downwardly out of the plane of the fastener 10 to form prongs 18, 19, and 20 and 21 respectively. The edges 22 and 23 of the shorter transverse sides of the fastener 10 may be bent upwardly in an opposite direction to the prongs to facilitate a lead in during assembly.

In FIGURE 3 are shown two abutting L-shaped panels 24 and 25 formed in their inner major surfaces with corresponding horizontal stopped slots 26, 27 and 28, 29 respectively. Each slot is slightly longer than half the length of a fastener and, as shown in FIGURE 4, dovetailed in cross section so that a fastener may be slid into and engaged therein.

To make the assembly shown in FIGURE 3 the tail 12 of a fastener 10 is pushed longitudinally into the slot 26 of the panel 24 until its end 22 abuts or almost abuts the end of the slot, the panel 25 is then brought into abutment with the panel 24 so that the head 13 of the fastener 10 which projects from the panel 24 is pushed into the slot 28. The bridge 11 of the fastener 10 is then approximately in alignment with the abutting edges of the panels 24 and 25. A similar fastener (not shown in FIGURE 3) is assembled in the slots 27 and 29 in the same way.

When a fastener 10 is inserted into the slots the lead in is facilitated by the upturned edges 22 and 23. At the same time the prongs 18, 19, 20 and 21 will ride relatively easily over the major surfaces of the slots, but will bite firmly into the material of the panels 24 and 25 if these are drawn apart. By this means the two panels 24 and 25 are effectively locked in abutting relationship. In FIGURE 3 the panels are shown just short of the abutting position.

In FIGURES 5 and 6 a modification of the fastener 10 is indicated generally at 30. The fastener 30 is similar in every respect to the fastener 10 of FIGURES 1 to 4 except that the fastener 30 which has a tail 31 and a head 32 is bent about the minor axis of symmetry of the strip so that the head 32 lies in a plane perpendicular to the plane of the tail 31. Thus the fastener 30 can be used, as shown in FIGURE 6 to secure two slotted panels 33 and 34 together in abutting relationship so that the panel 33 lies in a plane perpendicular to the plane of the panel 34, the method of assembly being similar to that of the fastener 10 and panels 24 and 25.

In FIGURES 7 and 8 another modification of the fastener 10 is indicated generally at 40. The fastener 40 is formed from an approximately L-shaped flat strip of spring metal so as to have a tail 41 and head 42 similar in every respect to the tail and head of the fastener 10 except that, while lying in the same plane the tail 41 and head 42 are at right angles to one another forming an L-shape. The apex forming the outer corner of the L-shaped strip is cut away to leave a flat edge 43 as shown in FIGURE 7.

The fastener 40 is used as shown in FIGURE 8 to secure two slotted strips 44 and 45 together at right angles, as for example at the corner of a picture frame. Slots are formed in the ends of each strip, as in the panels 24, 25 of FIGURE 3 or 33, 34 of FIGURE 6. The end of each strip 44 and 45 is mitred to an angle of 45° and the fastener 40 is then assembled in the slotted strips in the same way as the fasteners 10 and 30 are assembled with their respective slotted panels. If desired the strips 44 and 45 may be in the form of beadings.

The fastener 30 and 40 are shown with their respective tail and head formed at right angles but it will be appreciated that these fasteners could be used to secure two panels together at any angle, by adjusting the angle between the tail and the head portions of the fastener concerned.

In FIGURES 9 to 12 a further embodiment of the invention is indicated generally at 50. The fastener 50 is formed from a flat strip of spring metal bent about its minor axis so as to have a tail 51 and a head 52 such that the tail 51 is in a plane perpendicular to the plane of the head 52. The tail 51 is formed so as to be similar in every respect to the tail 12 of the fastener 10 of FIGURES 1 and 2, but the head 52 is formed with an aperture 53 instead of tongues. Before bending the strip about its minor axis a depression 54 is formed across the line of bending so as to stiffen the fastener and limit the relative angular flexure of the tail 51 and the head 52. If needed two such depressions may be formed across the line of bending.

The fastener 50 like the fastener 30 is used to hold two panels in abutting relationship so that one panel lies in a plane perpendicular to the other panel. The assembly is shown in FIGURE 12. The tail 51 of the fastener is pushed into an undercut slot in a panel 55 and a panel 56 is then screwed or bolted to the head 52 of the fastener 50 through the aperture 53 in the head of the fastener. If a screw is used for the purpose the aperture 53 as shown in the figures can be adapted to act as a thread to receive the screw.

In FIGURES 13 and 14 is shown a fastener 60 which is similar in all respects to that of FIGURES 9 to 11 except that prongs 61 and 62 are cut from the edges of the tail 63 instead of from within the area of the tail.

It may be necessary to withdraw any of the illustrative fasteners from a slot after assembly. To achieve this further feature the tongues carrying prongs which are formed in the head and tail of the fasteners 10, 30 and 40 and in the tail of the fasteners 50 and 60 may be replaced by square-nosed spring tongues formed without prongs. As shown in FIGURES 15 and 16 the spring tongues 64, 65 and 66, 67 respectively are bent in the same direction, with respect to the tail or head of the fastener in which they are formed, as the prongs. The square nosed spring tongues will bite into the material of the panels to be secured but not as firmly as those carrying prongs at their ends so that if sufficient force is applied to the fastener it may be withdrawn from the undercut slot.

It will be seen that all the fasteners described herein have the common feature of a portion which is formed with square nosed or pronged tongues and which is adapted to engage in a slot in a panel.

The fasteners of the present invention have been designed for use with thin panels made from a synthetic plastic material.

It has been found that such thin relatively soft panels shrink unevenly during the moulding process in the region of the the slot leaving deformations or depressions on the other surface of the panel.

Figure 18:
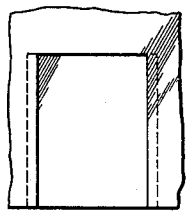
Figure 17:
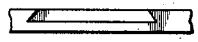

A slot of dove-tail cross section such as that shown in FIGURES 17 and 18 can be moulded shallower than a closed or overhanging slot of rectangular cross section and this leaves a greater depth of material between the floor of the slot and the outer surface of the panel which reduces or eliminates completely the deformation caused by uneven shrinkage.

A slot of dove-tail cross section has the further advantages that it presses the fastener down into engagement with the floor of the slot, it takes up both horizontal and vertical play of the fastener in the slot, and it allows for a considerable tolerance in the dimensions of the fastener and slot.

Figure 20:
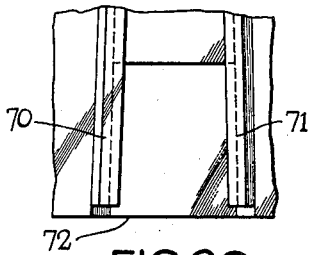
Figure 19:
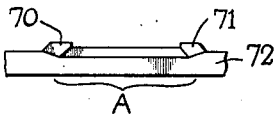

When the panels to be secured are exceptionally thin the slot may be formed as shown in FIGURES 19 and 20. Two ribs 70 and 71 running on either side of the slot form the overhang of the dove-tail and the slot is consequently shallower. This preserves the strength of the panel and lessens any deformation or depression formed by shrinkage on the outer side of the panel as at A in FIGURE 19. As shown in FIGURE 20 the ribs are inclined towards one another to facilitate withdrawal of a mould during the moulding process. They are also stopped short of the edge of the panel so that the head of any fastener having its head and tail lying in perpendicular planes when assembled in the slot will lie flush with the edge 72 of the panel.

What we claim is:

1. An assembly of two members in abutting relationship and connector between said members, at least one of said members having a dovetail groove adjacent an edge thereof, said dovetail groove including a bottom portion, spaced side walls and having a uniform cross section, said connector having a head portion and a tail portion, said head portion received within said dovetail groove and said head portion having a base portion, said base portion having resilient prongs extending therefrom, said prongs directed at the line of abutment between said members and bearing against the bottom portion of said dovetail slot, and the distance between the points of engagement of said prongs with the bottom portion of said slot and the points of engagement of said base portion with the side walls of said slot being less than the length of said prongs, and said tail portion having means of engaging said other members.

2. An assembly as claimed in claim 1 in which the said head and the said tail are inclined one to another at right angles whereby the said two members are secured together in abutting relationship and at right-angles one to the other.

3. An assembly as claimed in claim 1 in which the said head and the said tail are co-planar and inclined one to another at right angles whereby the said two members are secured together in abutting co-planar relationship and at right-angles one to the other.

4. An assembly as claimed in claim 1 in which the slot of dove-tail cross section is constituted by two raised overhanging ribs lying one on each side of the slot.

References Cited by the Examiner
UNITED STATES PATENTS

| | | | |
|---|---|---|---|
| 706,974 | 8/02 | Lyle | 50—443 |
| 942,693 | 12/09 | Wintermute | 20—92 |
| 1,165,155 | 12/15 | Cordes | 20—95 |
| 1,354,549 | 10/20 | Gilmer | 20—92 |
| 1,663,580 | 3/28 | Andersin | 20—92 |
| 2,553,882 | 5/51 | Sweet | 16—159 X |
| 2,673,169 | 3/54 | Finch | 20—92 X |

JACOB L. NACKENOFF *Primary Examiner.*

A. G. STONE, WILLIAM I. MUSHAKE, *Examiners.*